United States Patent [19]
Watson

[11] 3,728,031
[45] Apr. 17, 1973

[54] MULTICHROMATIC MULTIBEAM ABSORPTION PHOTOMETER
[75] Inventor: Emmett S. Watson, Jupiter, Fla.
[73] Assignee: Milton Roy Company, St. Petersburg, Fla.
[22] Filed: Nov. 29, 1971
[21] Appl. No.: 202,742

[52] U.S. Cl. ............ 356/195, 356/88, 356/92, 356/206, 356/222, 356/246, 250/218
[51] Int. Cl. ............................................ G01j 3/46
[58] Field of Search ................ 356/88, 92, 195, 356/206, 222, 246; 250/218

[56] References Cited

UNITED STATES PATENTS

| 3,137,758 | 6/1964 | Mason et al. | 88/195 UX |
| 3,586,441 | 6/1971 | Smith et al. | 356/97 |
| 3,590,255 | 6/1971 | Smith et al. | 356/88 X |
| 3,591,801 | 7/1971 | Watson | 356/206 X |

Primary Examiner—Ronald L. Wibert
Assistant Examiner—Paul K. Godwin
Attorney—Robert A. Buckles et al.

[57] ABSTRACT

Apparatus for simultaneously and continuously comparing the absorption in two sample cells at two wavelengths. Two adjacent sample cells are illuminated from adjacent sources radiating at different wavelengths. A first lens positioned near the cells forms images of the two sources. A second lens positioned near the source images forms images of the cells. A plane mirror just behind the second lens displaces radiation from one source so that there are formed two sets of cell images, each at a different wavelength. Photocells at the cell images, and a comparison circuit, allow the absorption in both cells at both wavelengths to be compared.

9 Claims, 5 Drawing Figures

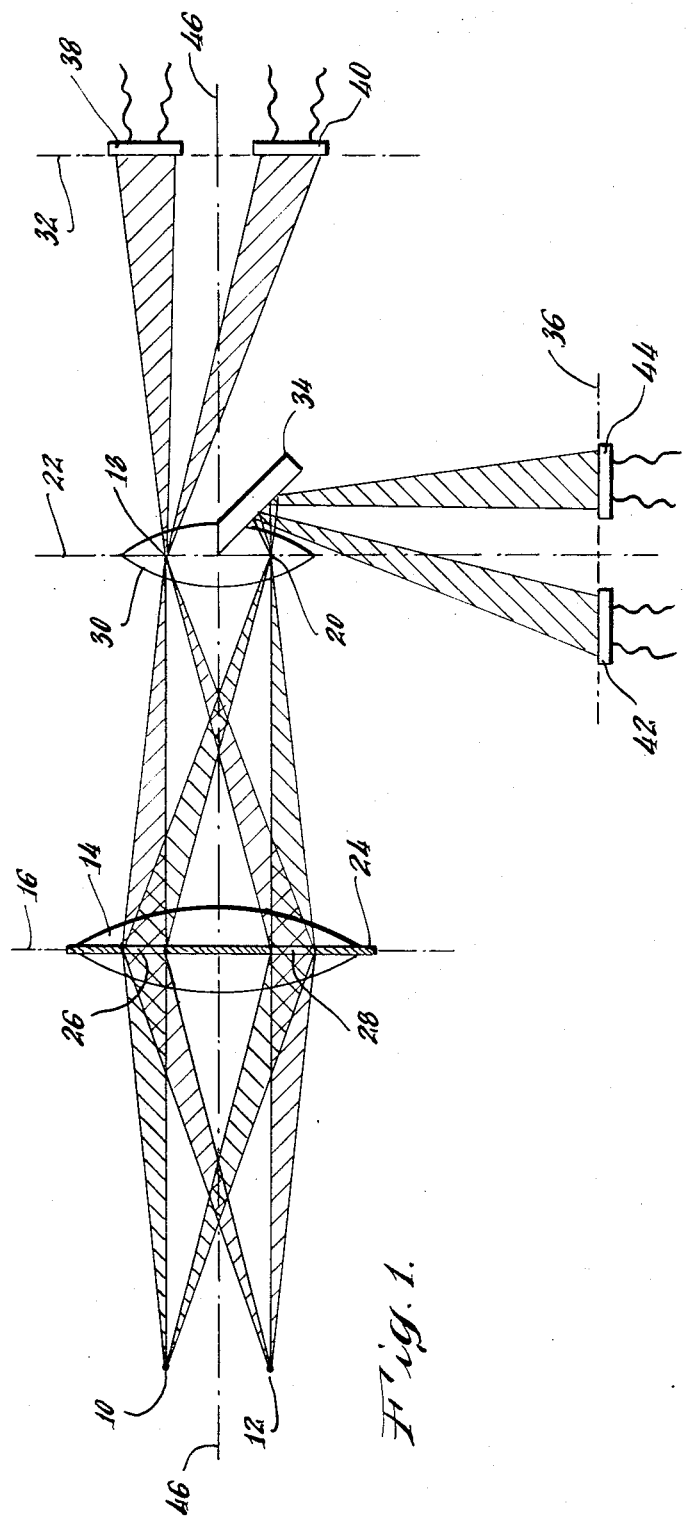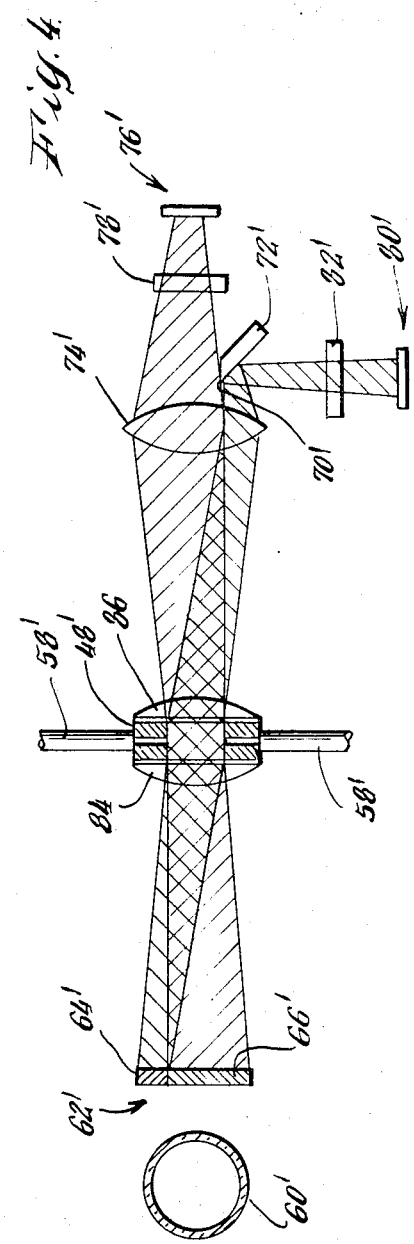
Fig. 1.
Fig. 4.

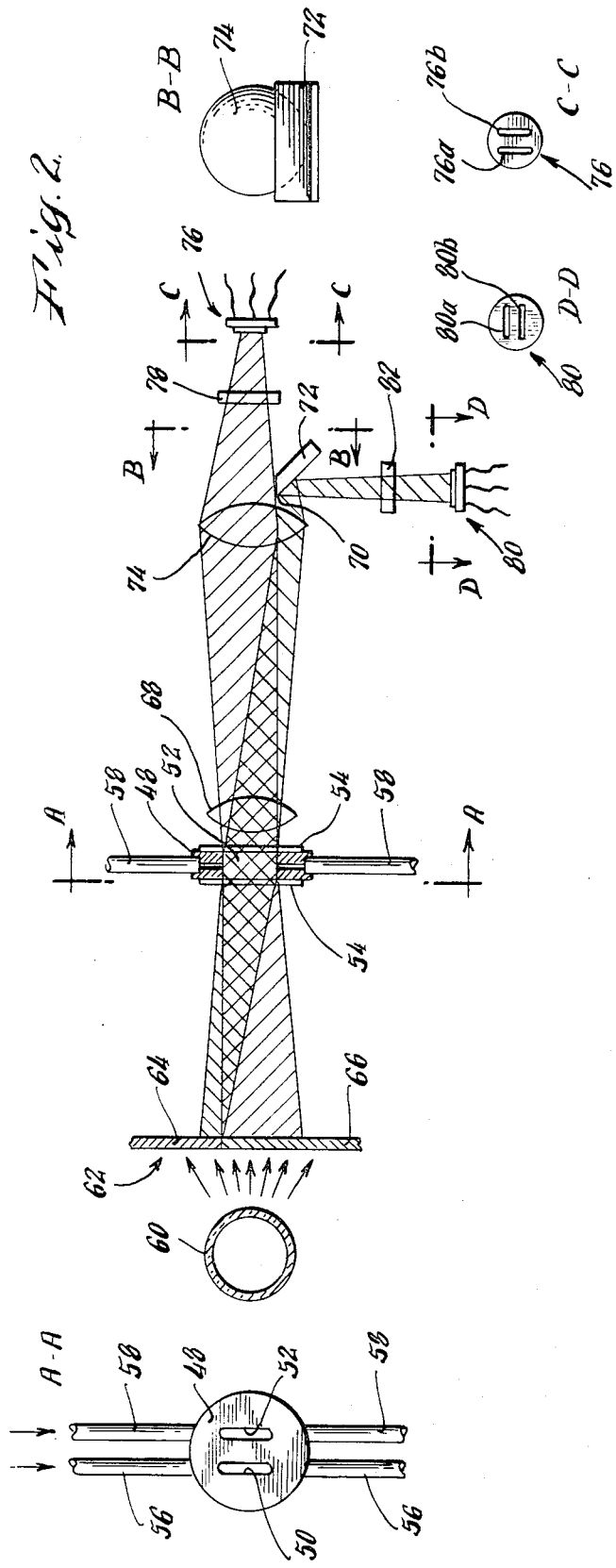

MULTICHROMATIC MULTIBEAM ABSORPTION PHOTOMETER

BACKGROUND OF THE INVENTION

This invention pertains to absorption photometry and, more particularly, to apparatus for simultaneously and continuously comparing the absorption of two different materials at two different wavelengths.

Analytical chemists often desire to measure the optical absorption of one or two materials at different wavelengths. However, all prior art techniques for accomplishing such measurements have certain drawbacks. For example, measuring the absorption at two wavelengths in different cells or at different times may provide ambiguous results arising from degradation or dilution. Such measurements have been attempted with multichromatic photometers which employ light choppers, filter wheels, or scanning monochromators. However, these instruments have moving parts, are complex, and reliability is questionable. Other prior art systems may have only one cell chamber. This limits the stability of comparative measurements made at any single wavelength.

Accordingly, it is a primary object of this invention to provide apparatus for simultaneously and continuously comparing the absorption in two or more cells at two or more wavelengths.

Other objects are to provide such an apparatus which has high sensitivity and stability with small cell volumes; which has high reliability; and which is relatively simple, compact and inexpensive. The manner in which these objects are achieved will be more apparent from the following description and appended claims.

SUMMARY OF THE INVENTION

In accordance with this invention there is provided a multichromatic multibeam apparatus for the simultaneous measurement of the optical properties of at least two materials at at least two wavelengths. It includes an array of at least two sources of electromagnetic radiation, each radiating in a different wavelength region. First means are provided for forming an image of the array and means are provided for positioning at least two materials near the first means in the path of radiation forming the image. Second means are positioned slightly ahead of the image plane of the array for forming an image of the materials. At least one mirror is positioned substantially in the image plane of the array to direct radiation from at least one of the sources in a different direction than radiations from the other source to form at least two sets of images of said materials, each of the sets being formed from radiation derived from a different source. Means are provided for comparing the relative intensities of the images as a measure of the optical properties of the materials at various wavelengths.

BRIEF DESCRIPTION OF THE DRAWINGS

FIG. 1 is an idealized schematic illustrating the optical principles of the invention;

FIG. 2 is a side view of one form of apparatus in accordance with the invention, with various elements thereof being further illustrated by the cross-sections A—A, B—B, C—C, D—D;

FIG. 3 is a top view of the apparatus of FIG. 2;

FIG. 4 illustrates a modification of the apparatus of the invention; and

DESCRIPTION OF THE PREFERRED EMBODIMENTS

Figure 5:
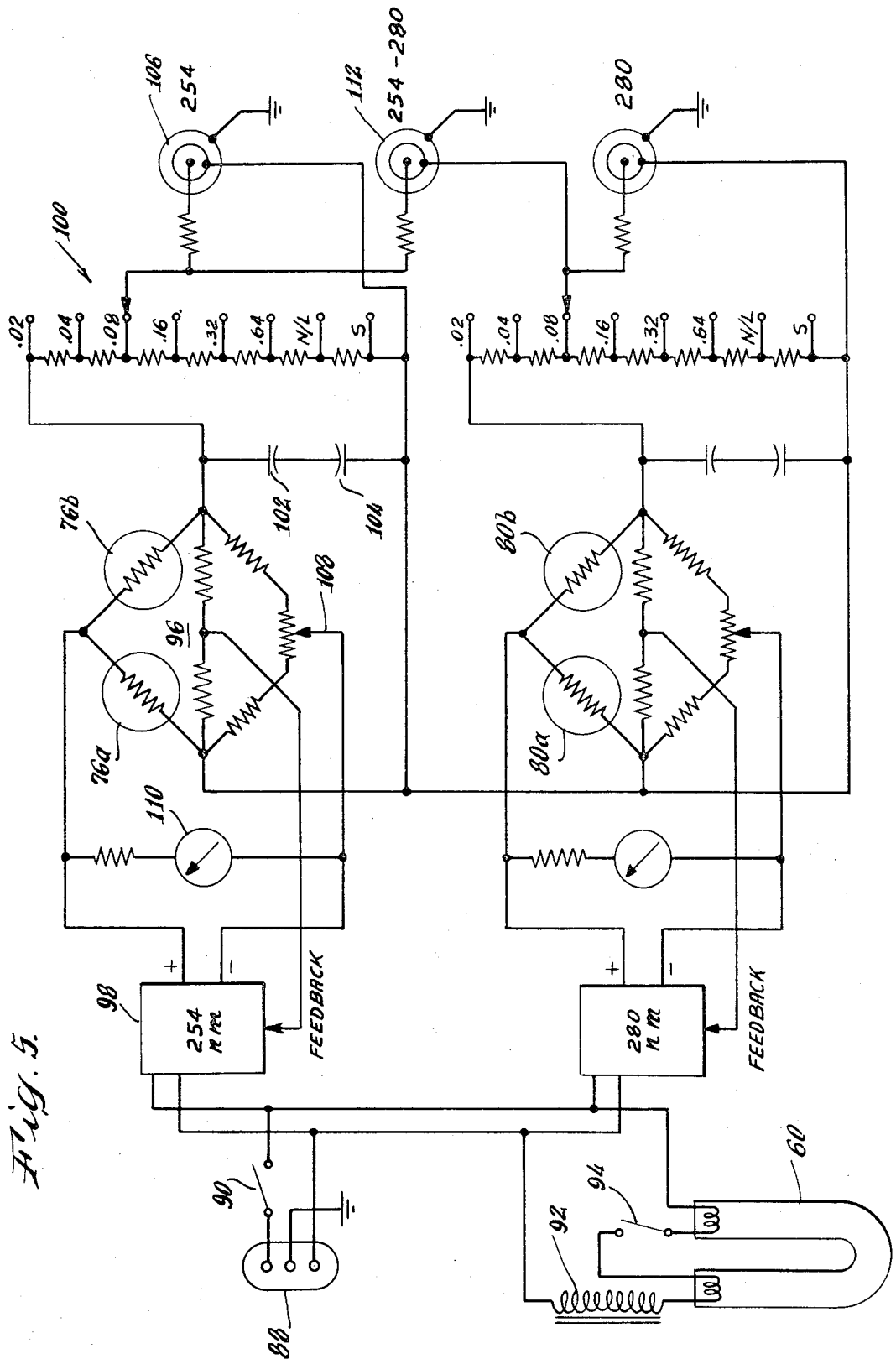
FIG. 5 is an electrical schematic of a comparison circuit usable with the invention.

FIG. 1 is an idealized schematic to which reference may be had for the purpose of understanding the principles of the invention. There are illustrated two radiation sources 10, 12, each radiating at a different wavelength. A lens 14 located in plane 16 forms source images 18, 20 at plane 22. Ideally located in plane 16 is an aperture plate 24 defining openings 26, 28 containing sample materials. It will be noted that each of the openings 26, 28 is illuminated by radiation coming from both wavelength sources 10, 12. Also, each source image 18, 20 is formed of radiation which has passed through both openings.

Ideally positioned in plane 22 is a lens 30. Lens 30 forms images of the openings 26, 28 which would normally fall at image plane 32. However, a plane mirror 34 is positioned to intercept and redirect radiation originating at source 10. Accordingly, the images of openings 26, 28 which are made up of radiation solely from source 10 are now formed at image plane 36.

Photocells 38, 40, 42 and 44 are positioned in the image planes 32, 36 to receive the four images. It will now be noted that the images formed on photocells 38, 40 are the images of both apertures 26, 28 but formed solely of radiation from source 12. Similarly, the images on photocells 42, 44 are also images of the two openings 26, 28 but formed solely of radiation originating at source 10. Furthermore, it will be apparent that all four images are formed of radiation which was within the openings 26, 28 at the same time so that measurements of the absorption characteristics of the two sample materials at both wavelengths may be made in real time. The electrical signals from the photocells may be compared in various ways to measure the relative absorption of the two sample materials at two wavelengths.

For ease of explanation, the foregoing description has been limited to a discussion of two sources and two samples. However, additional sources and additional sample materials could be employed by arranging them in any orientation in planes rotated about the optical axis 46. Of course, an appropriate array of mirrors and photocells would also be required In the idealized schematic of FIG. 1, the lenses, mirrors, and aperture plates are superimposed. However, a lens which is placed close to an object or image has negligible effect on that object or image. Accordingly, it is possible to construct a practical embodiment which retains the advantages described above. Such embodiments will now be described.

FIGS. 2 and 3 illustrate an apparatus in accordance with this invention for simultaneously monitoring and comparing the radiation absorption of two liquid streams at two wavelengths. These may be, for example, chromatographic effluents. The apparatus comprises a disc-shaped flow cell 48 defining a first sample chamber 50 and a second sample chamber 52 closed by plane windows 54. A first capillary sample tube 56 and a second capillary sample tube 58 permit the fluids to pass through the respective chambers.

The primary light source is a low pressure mercury vapor lamp 60 which irradiates a secondary source screen 62 with substantially monochromatic light at the mercury reasonance wavelength of 254 nm. A portion 64 of screen 62 is coated with a thin layer of magnesium oxide which simply scatters the 254 nm radiation and becomes a diffuse source. Another portion 66 is coated with a phosphor which absorbs the 254 nm radiation from the lamp 60 and converts it to a band of radiation at 280 nm. Portions 64, 66 thus become two extended and adjacent sources of radiation, each radiating at a different wavelength.

A lens 68 is positioned just behind the flow cell 48 and forms an image of the screen 62 in the plane of a knife edge 70 of an angled mirror 72. Another lens 74 is positioned just ahead of, but very close to, the source image plane and thus has very little effect on the source image.

Referring to FIG. 2, it will be noted that the dividing line between screen portions 64, 66 is displaced upward from the optical axis. Accordingly, the image of the dividing line, which appears in the plane of the mirror knife edge 70, is displaced downward from the optical axis. The knife edge 70 is positioned to coincide with the image of this dividing line. Therefore, mirror 72 intercepts only the light from screen portion 64 and only the light from screen portion 66 is allowed to pass. As a result of displacing the dividing line from the optical axis, a larger area of screen portion 66 than of screen portion 64 is viewed by the optical system. This is done to compensate for the lower effective radiance of the screen portion 66 as compared to screen portion 64 due to the energy losses involved in the phosphor conversion and filtering at 280 nm.

The lens 74 forms two sets of reduced images of the cell chambers 50, 52. One set impinges on dual photodetector 76 which has detecting regions 76a, 76b. This set consists only of 280 nm light from screen portion 66 which has been filtered by 280 nm bandpass filter 78. The other set of images impinges on dual photodetector 80 having detecting regions 80a, 80b. This set of images consists only of 254 nm light from screen portion 64 which has been reflected by mirror 72 and passed through visible light blocking filter 82. THe lens 68 has very little effect on the images of the cell chambers and what small effect it has can be compensated for by slight relocation of the photodetectors 76, 80.

FIG. 4 illustrates a modified version of the apparatus of FIGS. 2 and 3. It is substantially similar and identical parts are given the same reference numerals but with a prime (') attached. The basic distinction is that the windows of the flow cell are eliminated and their places taken by a collimating lens 84 and a focusing lens 86. These lenses together perform the same function as the lens 68 of the version shown in FIGS. 2 and 3.

It is important to note that in all the described embodiments, the two wavelengths are completely separated at the mirror 72 after having passed through the flow cell. Nonetheless, they are completely mixed within the flow cell chambers. As a result, measurements at the two wavelengths are truly simultaneous (in the same cell at the same time). The importance of this feature is that the difference readout of 254–280 nm has true significance. This is not the case with systems which make the measurements at the two wavelengths in different cells or at different times.

The above described optical system has a number of uses in the analysis of sample materials, both solid and liquid. Although specifically described with reference to chromatographic effluents, the invention is not so limited.

In FIG. 5, there is schematically illustrated an electrical measuring circuit for use with the above described optical systems and, more particularly, for the analysis of a chromatographic output. A 120 volt power source 88, connected through a main switch 90, operates the ultraviolet lamp 60 through a ballast 92 and starter 94. It also powers two identical channels, one for the 254 nm readout and the other for the 280 nm readout. As the channels are identical in construction and operation, only one will be described.

The photodetectors 76a, 76b are light sensitive resistors whose resistance is substantially inversely proportional to the intensity of the ultraviolet radiation impinging upon them. They are connected in a Wheatstone bridge circuit 96 which is excited by a feedback power supply 98. The output of the bridge circuit is attenuated by a range selector switch 100, filtered by capacitors 102, 104, and fed to a recorder jack 106. A zero control 108 adjusts the initial bridge balance for zero output, thus establishing the chromatogram baseline at the recorder zero.

When an ultraviolet absorbing solute emerges from the analytical column and passes through the corresponding fluid cell chamber, the amount of ultraviolet radiation reaching 76a is reduced. This unbalances the bridge, creating an output voltage which is recorded as a chromatographic peak.

If the bridge excitation voltage were constant, the readout would be zero stabilized against common mode effects, but would not be range stabilized. This means that the zero base line of the chromatogram would not be affected by variations in lamp brightness or common mode solvent absorption but the range sensitivity to absorption peaks would be affected by such changes. For example, a decrease in lamp brightness caused by temperature change or lamp aging would result in a corresponding decrease in range sensitivity. Therefore, the feedback power supply 98 has the further function of compensating for these effects, thus stabilizing the readout in range as well as zero. In addition, the feedback circuit automatically converts the readout to linear absorbance. The bridge excitation voltage is monitored by meter 110.

In addition to the recorder jack 106 for the 254 nm readout and a similar jack for the 280 nm readout, there is a third recorder jack 112. This jack is connected to supply a readout corresponding to the arithmetic difference in millivolts between the 254 and 280 nm readouts.

It is believed that the many advantages of this invention will now be apparent to those skilled in the art. It will also be apparent that a number of variations and modifications may be made in this invention without departing from its spirit and scope. Accordingly, the foregoing description is to be construed as illustrative only, rather than limiting. This invention is limited only by the scope of the following claims.

I claim:

1. Apparatus for the simultaneous measurement of the optical properties of at least two materials at at least two wavelengths which comprises:

an array of at least two sources of electromagnetic radiation, each radiating in a different wavelength region;

first means for forming an image of said array;

means for positioning at least two materials near said first means in the path of radiation forming said image;

second means positioned slightly ahead of the image plane of said array for forming an image of said materials;

at least one mirror positioned substantially in the image plane of said array to direct radiation from at least one of said sources in a different direction than radiation from another of said sources to form at least two sets of images of said materials, each of said sets being formed from radiation derived from a different source; and means for comparing the relative intensities of said material images as a measure of the optical properties of said materials at various wavelengths.

2. The apparatus of claim 1 wherein said sources are derived from a common primary source.

3. The apparatus of claim 1 wherein said first and second image forming means are lenses.

4. The apparatus of claim 1 wherein said means for positioning comprises a cell defining first and second sample chambers therein.

5. The apparatus of claim 4 wherein said cell includes inlet and outlet tubing means in fluid flow communication with each of said sample chambers.

6. The apparatus of claim 1 wherein said means for comparing comprises a photoelectric sensor positioned to receive each of said material images.

7. The apparatus of claim 6 wherein the photoelectric sensors for a first set of material images are connected in a first bridge circuit, the photoelectric sensors for a second set of material images are connected in a second bridge circuit, and the outputs of said bridge circuits are arranged for connection to a recorder.

8. Apparatus for the simultaneous measurement of the optical absorption of two materials at two wavelengths which comprises:

two sources of electromagnetic radiation, each radiating in a different wavelength region;

a first lens positioned to form an image of said sources;

a cell defining first and second sample chambers positioned near said first lens in the path of radiation forming said source image;

a second lens positioned slightly ahead of the source image plane to form an image of said sample chambers;

an angled mirror having a knife edge positioned substantially in said source image plane to direct radiation from one of said sources in a different direction than radiation from the other of said sources to form two sets of images of said chambers, each set being formed from radiation derived from a different source; and means for comparing the relative intensities of said chamber images as a measure of the relative absorption of samples within said chambers at both wavelengths.

9. The apparatus of claim 8 wherein said cell includes inlet and outlet tubing in fluid flow communication with each of said sample chambers.

* * * * *